(12) United States Patent
Murahashi et al.

(10) Patent No.: US 8,918,800 B2
(45) Date of Patent: Dec. 23, 2014

(54) RECEIVING APPARATUS AND RECEIVING METHOD, BROADCASTING APPARATUS AND BROADCASTING METHOD, INFORMATION PROCESSING APPARATUS AND INFORMATION PROCESSING METHOD, BIDIRECTIONAL COMMUNICATION SYSTEM AND BIDIRECTIONAL COMMUNICATION METHOD, AND PROVIDING MEDIUM

(75) Inventors: Hideki Murahashi, Tokyo (JP); Kairi Sai, Tokyo (JP); Shi-hyong Cho, Kanagawa (JP)

(73) Assignee: Sony Corporation, Tokyo (JP)

(*) Notice: Subject to any disclaimer, the term of this patent is extended or adjusted under 35 U.S.C. 154(b) by 361 days.

(21) Appl. No.: 12/877,828

(22) Filed: Sep. 8, 2010

(65) Prior Publication Data

US 2011/0131608 A1 Jun. 2, 2011

Related U.S. Application Data

(62) Division of application No. 09/571,902, filed on May 16, 2000, now Pat. No. 8,108,886.

(30) Foreign Application Priority Data

May 18, 1999 (JP) ................................. 2011-136694

(51) Int. Cl.
*H04N 7/16* (2011.01)
*H04N 5/445* (2011.01)
(Continued)

(52) U.S. Cl.
CPC .............. *H04N 7/173* (2013.01); *H04H 60/97* (2013.01); *H04N 21/4722* (2013.01);
(Continued)

(58) Field of Classification Search
CPC ... H04N 21/25; H04N 21/251; H04N 21/252; H04N 21/258; H04N 21/25808; H04N 21/25866; H04N 21/25891; H04N 21/25883; H04N 21/422; H04N 21/42204; H04N 21/42213; H04N 21/44222
USPC ................................................... 725/9–14, 46
See application file for complete search history.

(56) References Cited

U.S. PATENT DOCUMENTS

| 4,704,725 A | 11/1987 | Harvey et al. |
| 5,374,951 A | 12/1994 | Welsh |

(Continued)

FOREIGN PATENT DOCUMENTS

| WO | WO 93/16443 | 8/1993 |
| WO | WO 94/15417 | 7/1994 |

(Continued)

OTHER PUBLICATIONS

European Search Report for Application No. EP10168066, mailed Aug. 19, 2010, 5 pages.

*Primary Examiner* — An Son P Huynh
(74) *Attorney, Agent, or Firm* — Finnegan, Henderson, Farabow, Garrett & Dunner, LLP

(57) ABSTRACT

When the user of a receiving apparatus presses a notice button provided for a remote controller to indicate the preference concerning the person or thing appearing on the screen of the program being viewed, the corresponding signal is transmitted to the receiving section of a set-top box. A view-log storage section stores an input operation command (including the signal indicating that the notice button has been pressed) together with the receiving time thereof as a view log. A view-information generating section reads the view log, generates a view-information packet, and outputs it to a bidirectional communication section. The bidirectional communication section transmits the view-information packet input from the view-information generating section to a broadcasting apparatus through a bidirectional communication network.

5 Claims, 12 Drawing Sheets

(51) Int. Cl.
*H04H 60/97* (2008.01)
*H04N 21/4722* (2011.01)
*H04N 21/442* (2011.01)
*H04N 21/258* (2011.01)
*H04H 60/46* (2008.01)
*H04N 21/858* (2011.01)
*H04N 7/173* (2011.01)
*H04N 21/81* (2011.01)
*H04N 21/422* (2011.01)
*H04N 21/433* (2011.01)
*H04N 21/475* (2011.01)
*H04N 21/658* (2011.01)

(52) U.S. Cl.
CPC .. *H04N 21/44222* (2013.01); *H04N 21/25891* (2013.01); *H04H 60/46* (2013.01); *H04N 21/8586* (2013.01); *H04N 21/812* (2013.01); *H04N 21/42204* (2013.01); *H04N 21/4332* (2013.01); *H04N 21/4756* (2013.01); *H04N 21/6582* (2013.01)
USPC ......... 725/13; 725/9; 725/10; 725/14; 725/46

(56) References Cited

U.S. PATENT DOCUMENTS

| | | | |
|---|---|---|---|
| 5,561,811 A | 10/1996 | Bier | |
| 5,589,892 A | 12/1996 | Knee et al. | |
| 5,600,364 A | 2/1997 | Hendricks et al. | |
| 5,610,653 A | 3/1997 | Abecassis | |
| 5,629,733 A | 5/1997 | Youman et al. | |
| 5,663,756 A | 9/1997 | Blahut et al. | |
| 5,717,814 A | 2/1998 | Abecassis | |
| 5,721,583 A | 2/1998 | Harada et al. | |
| 5,758,257 A | 5/1998 | Herz et al. | |
| 5,758,259 A | 5/1998 | Lawler | |
| 5,774,170 A | 6/1998 | Hite et al. | |
| 5,778,182 A | 7/1998 | Cathey et al. | |
| 5,790,426 A | 8/1998 | Robinson | |
| 5,798,785 A | 8/1998 | Hendricks et al. | |
| 5,801,747 A | 9/1998 | Bedard | |
| 5,815,146 A | 9/1998 | Youden et al. | |
| 5,818,439 A | 10/1998 | Nagasaka et al. | |
| 5,828,419 A | 10/1998 | Bruette et al. | |
| 5,835,087 A | 11/1998 | Herz et al. | |
| 5,848,396 A | 12/1998 | Gerace | |
| 5,867,226 A * | 2/1999 | Wehmeyer et al. | 725/46 |
| 5,872,588 A * | 2/1999 | Aras et al. | 725/14 |
| 5,884,056 A | 3/1999 | Steele | |
| 5,915,243 A | 6/1999 | Smolen | |
| 5,926,206 A | 7/1999 | Mihara et al. | |
| 5,929,849 A | 7/1999 | Kikinis | |
| 5,945,988 A * | 8/1999 | Williams et al. | 715/747 |
| 5,990,803 A | 11/1999 | Park | |
| 6,025,837 A | 2/2000 | Matthews et al. | |
| 6,029,045 A | 2/2000 | Picco et al. | |
| 6,040,829 A | 3/2000 | Croy et al. | |
| 6,067,561 A | 5/2000 | Dillon | |
| 6,088,722 A | 7/2000 | Herz et al. | |
| 6,112,186 A * | 8/2000 | Bergh et al. | 705/7.32 |
| 6,124,877 A | 9/2000 | Schmidt | |
| 6,130,726 A | 10/2000 | Darbee et al. | |
| 6,144,375 A | 11/2000 | Jain et al. | |
| 6,144,401 A | 11/2000 | Casement et al. | |
| 6,154,771 A | 11/2000 | Rangan et al. | |
| 6,157,809 A | 12/2000 | Kambayashi | |
| 6,177,931 B1 * | 1/2001 | Alexander et al. | 725/52 |
| 6,184,877 B1 | 2/2001 | Dodson et al. | |
| 6,226,793 B1 | 5/2001 | Kwoh | |
| 6,236,395 B1 | 5/2001 | Sezan et al. | |
| 6,240,555 B1 | 5/2001 | Shoff et al. | |
| 6,286,005 B1 * | 9/2001 | Cannon | 705/14.66 |
| 6,286,140 B1 | 9/2001 | Ivanyi | |
| 6,298,482 B1 * | 10/2001 | Seidman et al. | 725/101 |
| 6,317,722 B1 | 11/2001 | Jacobi et al. | |
| 6,326,982 B1 | 12/2001 | Wu et al. | |
| 6,359,661 B1 * | 3/2002 | Nickum | 348/734 |
| 6,389,593 B1 | 5/2002 | Yamagishi | |
| 6,415,438 B1 | 7/2002 | Blackketter et al. | |
| 6,424,998 B2 | 7/2002 | Hunter | |
| 6,446,261 B1 | 9/2002 | Rosser | |
| 6,457,010 B1 | 9/2002 | Eldering et al. | |
| 6,463,585 B1 | 10/2002 | Hendricks et al. | |
| 6,473,128 B1 | 10/2002 | Berger | |
| 6,481,011 B1 | 11/2002 | Lemmons | |
| 6,505,348 B1 | 1/2003 | Knowles et al. | |
| 6,530,082 B1 * | 3/2003 | Del Sesto et al. | 725/9 |
| 6,530,083 B1 * | 3/2003 | Liebenow | 725/46 |
| 6,553,178 B2 | 4/2003 | Abecassis | |
| 6,564,244 B1 | 5/2003 | Ito et al. | |
| 6,567,980 B1 | 5/2003 | Jain et al. | |
| 6,601,103 B1 | 7/2003 | Goldschmidt Iki et al. | |
| 6,609,251 B1 | 8/2003 | Yoneda | |
| 6,611,958 B1 * | 8/2003 | Shintani et al. | 725/58 |
| 6,631,522 B1 | 10/2003 | Erdelyi | |
| 6,637,028 B1 | 10/2003 | Voyticky et al. | |
| 6,637,029 B1 | 10/2003 | Maissel et al. | |
| 6,637,032 B1 | 10/2003 | Feinleib | |
| 6,681,394 B1 | 1/2004 | Fujita et al. | |
| 6,684,194 B1 | 1/2004 | Eldering et al. | |
| 6,698,020 B1 | 2/2004 | Zigmond et al. | |
| 6,704,929 B1 | 3/2004 | Ozer et al. | |
| 6,708,335 B1 | 3/2004 | Ozer et al. | |
| 6,711,741 B2 | 3/2004 | Yeo | |
| 6,721,954 B1 | 4/2004 | Nickum | |
| 6,721,955 B2 | 4/2004 | Khoo et al. | |
| 6,727,914 B1 | 4/2004 | Gutta | |
| 6,732,369 B1 | 5/2004 | Schein et al. | |
| 6,766,526 B1 | 7/2004 | Ellis | |
| 6,796,555 B1 * | 9/2004 | Blahut | 370/395.1 |
| 6,898,762 B2 | 5/2005 | Ellis et al. | |
| 6,922,843 B1 | 7/2005 | Herrington et al. | |
| 6,928,652 B1 | 8/2005 | Goldman | |
| 6,934,964 B1 | 8/2005 | Schaffer et al. | |
| 6,983,478 B1 | 1/2006 | Grauch et al. | |
| 7,117,518 B1 * | 10/2006 | Takahashi et al. | 725/46 |
| 7,209,942 B1 | 4/2007 | Hori et al. | |
| 7,313,808 B1 | 12/2007 | Gupta et al. | |
| 7,844,985 B2 * | 11/2010 | Hendricks et al. | 725/35 |
| 2001/0020242 A1 | 9/2001 | Gupta et al. | |
| 2002/0059588 A1 * | 5/2002 | Huber et al. | 725/35 |
| 2003/0020744 A1 * | 1/2003 | Ellis et al. | 345/723 |
| 2003/0149988 A1 | 8/2003 | Ellis et al. | |
| 2004/0117831 A1 | 6/2004 | Ellis et al. | |
| 2005/0028208 A1 | 2/2005 | Ellis et al. | |
| 2005/0149964 A1 * | 7/2005 | Thomas et al. | 725/9 |
| 2006/0271993 A1 | 11/2006 | Nakata et al. | |

FOREIGN PATENT DOCUMENTS

| | | |
|---|---|---|
| WO | WO 98/20678 | 5/1998 |
| WO | WO 00/54504 | 9/2000 |

* cited by examiner

| VIEW EVENT | PARAMETER |
|---|---|
| VIEW START | NONE |
| VIEW END | NONE |
| VIEWER CHANGE | VIEWER ID |
| CHANNEL CHANGE | CHANNEL NUMBER |
| NOTICE-BUTTON PRESSING | NONE |

FIG. 9

| VIEW EVENT | PARAMETER | TIME |
|---|---|---|
| VIEW CHANGE | VIEWER ID | $t_1$ |
| CHANNEL CHANGE | CHANNEL NUMBER | $t_2$ |
| NOTICE-BUTTON PRESSING | | $t_3$ |
| ⋮ | ⋮ | ⋮ |
| NOTICE-BUTTON PRESSING | | $t_n$ |

FIG. 10

| SET-TOP BOX ID |
|---|
| NUMBER (=n) OF RECORDINGS |
| VIEW EVENT |
| PARAMETER |
| TIME |
| VIEW EVENT |
| PARAMETER |
| TIME |
| ⋮ |
| VIEW EVENT |
| PARAMETER |
| TIME |

FIG. 12

| VIEWER ID : | XYZ 12345 | |
|---|---|---|

| VIEW EVENT | PARAMETER | TIME |
|---|---|---|
| VIEW START | CHANNEL NUMBER | $t_1$ |
| CHANNEL CHANGE | CHANNEL NUMBER | $t_2$ |
| NOTICE-BUTTON PRESSING | | $t_1$ |
| ⋮ | ⋮ | ⋮ |
| NOTICE-BUTTON PRESSING | | $t_{n-1}$ |
| VIEW END | | $t_n$ |

FIG. 13

| EXTRACTING CONDITION ID : | ABC 12345 |
| CHANNEL CONDITION : | 10 |

CONDITIONS FOR VIEW EVENTS

| EVENT CONDITION | START TIME CONDITION | END TIME CONDITION |
| --- | --- | --- |
| NOTICE-BUTTON PRESSING | $t_1$ | $t'_1$ |
| NOTICE-BUTTON PRESSING | $t_2$ | $t'_2$ |
| ⋮ | ⋮ | ⋮ |
| NOTICE-BUTTON PRESSING | $t_I$ | $t'_I$ |

| VIEWER ID : | XYZ 12345 |

| EXTRACTING CONDITION ID | NUMBER OF MATCHES |
|---|---|
| ABC 12345 | 2 |
|  |  |
| ⋮ | ⋮ |
|  |  |

RECEIVING APPARATUS AND RECEIVING METHOD, BROADCASTING APPARATUS AND BROADCASTING METHOD, INFORMATION PROCESSING APPARATUS AND INFORMATION PROCESSING METHOD, BIDIRECTIONAL COMMUNICATION SYSTEM AND BIDIRECTIONAL COMMUNICATION METHOD, AND PROVIDING MEDIUM

This Application is a divisional of application Ser No. 09/571,902, filed May 16, 2000 now U.S. Pat. No. 8,108,886, currently pending, which claims priority of Japanese Patent Application No. 11-136694, filed May 18, 1999, both of which are incorporated herein by reference in their entirety.

BACKGROUND OF THE INVENTION

1. Field of the Invention

The present invention relates to receiving apparatuses and receiving methods, broadcasting apparatuses and broadcasting methods, information processing apparatuses and information processing methods, bidirectional communication systems and bidirectional communication methods, and providing media, and more particularly, to a receiving apparatus and a receiving method, a broadcasting apparatus and a broadcasting method, an information processing apparatus and an information processing method, a bidirectional communication system and a bidirectional communication method, and a providing medium which allow additional information corresponding to a real-time response from a viewer concerning a television broadcasting program to be transmitted.

2. Description of the Related Art

Conventionally, in television broadcasting, a broadcasting station unidirectionally transmits programs created by the station to viewers and the viewers just view the programs in a passive manner.

Recently, cable-television broadcasting services have been widespread. With the use of cable networks, not only a broadcasting station sends programs to viewers but also the viewers can send back predetermined information to the broadcasting station, if necessary. Therefore, bidirectional communication services, such as a viewer-participating program, an electronic program guide corresponding to the viewer's preference, on-line shopping, and electronic direct mail, can be implemented.

As an existing bidirectional communication service, an IT vision has been used in which the viewer can send predetermined information to a broadcasting station by using a public telephone line.

Since a service screen (GUI: graphic user interface) in the existing bidirectional communication service provides a menu, however, the viewer can just select one among items prepared in advance by the broadcasting station. Therefore, if the viewer is interested in a person, a thing, or music which appears in the program or the commercial being broadcasted, the viewer cannot send preference information in real time, that is, preference information concerning the person, the thing, or the music "which is now appearing on or with the screen."

The preference information of the viewer concerning the person, the thing, or the music which is appearing "on or with the program or the commercial being transmitted" is important for the broadcasting station to create programs, but the broadcasting station cannot obtain the preference information.

SUMMARY OF THE INVENTION

The present invention has been made in consideration of the above situation. Accordingly, it is an object of the present invention to allow the preference information of the viewer concerning the program or the commercial being broadcasted to be obtained in real time.

The foregoing object is achieved in one aspect of the present invention through the provision of a receiving apparatus for receiving a television broadcasting signal, including operation-command input means for inputting a user's operation command; television-broadcasting-signal receiving means for receiving the television broadcasting signal according to the operation command input by the operation-command input means; preference input means for inputting the preference of the user concerning the television broadcasting program being currently received by the television-broadcasting-signal receiving means; storage means for storing the view event formed of the operation command input by the operation-command input means and the preference input by the preference input means, together with the input times; view-information generating means for generating view information by using the view event and the input times stored by the storage means; and view-information transmitting means for transmitting the view information generated by the view-information generating means.

The foregoing object is achieved in another aspect of the present invention through the provision of a receiving method for a receiving apparatus for receiving a television broadcasting signal, including an operation-command input step of inputting a user's operation command; a television-broadcasting-signal receiving step of receiving the television broadcasting signal according to the operation command input in the operation-command input step; a preference input step of inputting the preference of the user concerning the television broadcasting program being currently received in the television-broadcasting-signal receiving step; a storage step of storing the view event formed of the operation command input in the operation-command input step and the preference input in the preference input step, together with the input times; a view-information generating step of generating view information by using the view event and the input times stored in the storage step; and a view-information transmitting step of transmitting the view information generated in the view-information generating step.

The foregoing object is achieved in still another aspect of the present invention through the provision of a providing medium for providing a computer-readable program which makes a receiving apparatus for receiving a television broadcasting signal execute processing, the processing including an operation-command input step of inputting a user's operation command; a television-broadcasting-signal receiving step of receiving the television broadcasting signal according to the operation command input in the operation-command input step; a preference input step of inputting the preference of the user concerning the television broadcasting program being currently received in the television-broadcasting-signal receiving step; a storage step of storing the view event formed of the operation command input in the operation-command input step and the preference input in the preference input step, together with the input times; a view-information generating step of generating view information by using the view event and the input times stored in the storage step; and a view-information transmitting step of transmitting the view information generated in the view-information generating step.

In the receiving apparatus, the receiving method, and the providing medium, a user's operation command is input, the television broadcasting signal corresponding to the input operation command is received, and the preference of the user concerning the television broadcasting program being currently received is input. The view event formed of the input operation command and the preference is stored together with the input times, and view information is generated by using the view event and the input times and is transmitted.

Since the preference of the user concerning the television broadcasting program being currently received is input, and the view information is generated by using the preference and the input time thereof, the preference of the viewer concerning the program or the commercial being currently broadcasted can be transmitted in real time.

The foregoing object is achieved in yet another aspect of the present invention through the provision of a broadcasting apparatus for transmitting a television broadcasting signal, including view-information storage means for sorting input view information by viewer and for storing it; preference-information generating means for retrieving the view information stored by the view-information storage means by using a predetermined retrieving condition and for generating the preference information of each viewer; additional-information generating means for generating additional information according to the preference information generated by the preference-information generating means; and additional-information transmitting means for multiplexing the additional information generated by the additional-information generating means on the television broadcasting signal and for transmitting it.

The foregoing object is achieved in still yet another aspect of the present invention through the provision of a broadcasting method for a broadcasting apparatus for transmitting a television broadcasting signal, including a view-information storage step of sorting input view information by viewer and of storing it; a preference-information generating step of retrieving the view information stored in the view-information storage step, by using a predetermined retrieving condition and of generating the preference information of each viewer; an additional-information generating step of generating additional information according to the preference information generated in the preference-information generating step; and an additional-information transmitting step of multiplexing the additional information generated in the additional-information generating step on the television broadcasting signal and of transmitting it.

The foregoing object is achieved in a further aspect of the present invention through the provision of a providing medium for providing a computer-readable program which makes a broadcasting apparatus for transmitting a television broadcasting signal execute processing, the processing including a view-information storage step of sorting input view information by viewer and of storing it; a preference-information generating step of retrieving the view information stored in the view-information storage step, by using a predetermined retrieving condition and of generating the preference information of each viewer; an additional-information generating step of generating additional information according to the preference information generated in the preference-information generating step; and an additional-information transmitting step of multiplexing the additional information generated in the additional-information generating step on the television broadcasting signal and of transmitting it.

In the broadcasting apparatus, the broadcasting method, and the providing medium, input view information is sorted by viewer and is stored, the stored view information is retrieved by using a predetermined retrieving condition, and the preference information of each viewer is generated. Additional information is generated according to the generated preference information, and the generated additional information is multiplexed on a television broadcasting signal and is transmitted.

Since the input view information is sorted by viewer and is stored, the stored view information is retrieved by using a predetermined retrieving condition, and the additional information is generated according to the result of the retrieving, that is, the preference information, the additional information corresponding to the preference of the viewer can be transmitted.

The foregoing object is achieved in a still further aspect of the present invention through the provision of an information processing apparatus connected to a broadcasting apparatus which transmits a television broadcasting signal, including retrieving-condition generating means for generating a retrieving condition and for sending it to the broadcasting apparatus; retrieving-result receiving means for receiving the result of the retrieving performed by the use of the retrieving condition; and requesting means for requesting the broadcasting apparatus to generate additional information according to the result of the retrieving.

The foregoing object is achieved in a yet further aspect of the present invention through the provision of an information processing method for an information processing apparatus connected to a broadcasting apparatus which transmits a television broadcasting signal, including a retrieving-condition generating step of generating a retrieving condition and of sending it to the broadcasting apparatus; a retrieving-result receiving step of receiving the result of the retrieving performed by the use of the retrieving condition; and a requesting step of requesting the broadcasting apparatus to generate additional information according to the result of the retrieving.

The foregoing object is achieved in a still yet further aspect of the present invention through the provision of a providing medium for providing a computer-readable program which makes an information processing apparatus connected to a broadcasting apparatus which transmits a television broadcasting signal execute processing, the processing including a retrieving-condition generating step of generating a retrieving condition and of sending it to the broadcasting apparatus; a retrieving-result receiving step of receiving the result of the retrieving performed by the use of the retrieving condition; and a requesting step of requesting the broadcasting apparatus to generate additional information according to the result of the retrieving.

In the information processing apparatus, the information processing method, and the providing medium, the retrieving condition is generated and sent to the broadcasting apparatus, the result of the retrieving performed by the use of the retrieving condition is received, and the broadcasting apparatus is requested to generate additional information according to the result of the retrieving.

Since the retrieving condition is generated and sent to the broadcasting apparatus, the preference of the viewer concerning a particular person or thing can be obtained in real time.

The foregoing object is achieved in a more further aspect of the present invention through the provision of a bidirectional communication system including a receiving apparatus for receiving a television broadcasting signal, including operation-command input means for inputting a user's operation command; television-broadcasting-signal receiving means for receiving the television broadcasting signal according to the operation command input by the operation-command input means; preference input means for inputting the preference of the user concerning the television broadcasting program being currently received by the television-broadcasting-signal receiving means; storage means for storing the view event formed of the operation command input by the operation-command input means and the preference input by the preference input means, together with the input times; view-information generating means for generating view information by using the view event and the input times stored by the storage means; and view-information transmitting means for transmitting the view information generated by the view-information generating means, a broadcasting apparatus for transmitting the television broadcasting signal, including view-information storage means for sorting input view information by viewer and for storing it; preference-information generating means for retrieving the view information stored by the view-information storage means, by using a predetermined retrieving condition and for generating the preference information of each viewer; additional-information generating means for generating additional information according to the preference information generated by the preference-information generating means; and additional-information transmitting means for multiplexing the additional information generated by the additional-information generating means on the television broadcasting signal and for transmitting it, and an information processing apparatus operated by the sponsor of a television broadcasting program, including retrieving-condition generating means for generating a retrieving condition and for sending it to the broadcasting apparatus; retrieving-result receiving means for receiving the result of the retrieving performed by the use of the retrieving condition; and requesting means for requesting the broadcasting apparatus to generate additional information according to the result of the retrieving.

The foregoing object is achieved in a still more further aspect of the present invention through the provision of a bidirectional communication method for a bidirectional communication system formed of a receiving apparatus for receiving a television broadcasting signal, a broadcasting apparatus for transmitting the television broadcasting signal, and an information processing apparatus operated by the sponsor of a television broadcasting program, including a receiving method for the receiving apparatus including an operation-command input step of inputting a user's operation command; a television-broadcasting-signal receiving step of receiving the television broadcasting signal according to the operation command input in the operation-command input step; a preference input step of inputting the preference of the user concerning the television broadcasting program being currently received in the television-broadcasting-signal receiving step; a storage step of storing the view event formed of the operation command input in the operation-command input step and the preference input in the preference input step, together with the input times; a view-information generating step of generating view information by using the view event and the input times stored in the storage step; and a view-information transmitting step of transmitting the view information generated in the view-information generating step, a broadcasting method for the broadcasting apparatus including a view-information storage step of sorting input view information by viewer and of storing it; a preference-information generating step of retrieving the view information stored in the view-information storage step, by using a predetermined retrieving condition and of generating the preference information of each viewer; an additional-information generating step of generating additional information according to the preference information generated in the preference-information generating step; and an additional-information transmitting step of multiplexing the additional information generated in the additional-information generating step on the television broadcasting signal and of transmitting it, and an information processing method for the information processing apparatus including retrieving-condition generating step of generating a retrieving condition and of sending it to the broadcasting apparatus; a retrieving-result receiving step of receiving the result of the retrieving performed by the use of the retrieving condition; and a requesting step of requesting the broadcasting apparatus to generate additional information according to the result of the retrieving.

In the bidirectional communication system and the bidirectional communication method, a user's operation command is input, the television broadcasting signal corresponding to the input operation command is received, and the preference of the user concerning the television broadcasting program being currently received is input, in the receiving apparatus. The view event formed of the input operation command and the preference is stored together with the input times, and view information is generated by using the view event and the input times and is transmitted. In addition, in the broadcasting apparatus, the input view information is sorted by viewer and is stored, the stored view information is retrieved by using a predetermined retrieving condition, and the preference information of each viewer is generated. Additional information is generated according to the generated preference information, and the generated additional information is multiplexed on the television broadcasting signal and is transmitted. Further, in the information processing apparatus, the retrieving condition is generated and sent to the broadcasting apparatus, the result of the retrieving performed by the use of the retrieving condition is received, and the broadcasting apparatus is requested to generate the additional information according to the result of the retrieving.

Since the receiving apparatus generates and transmits the view information, and the broadcasting apparatus retrieves the input view information by using a predetermined retrieving condition, generates the additional information according to the result of the retrieving, that is, the preference information, and transmits it, the additional information corresponding to the preference of the viewer can be transmitted. In addition, since the information processing apparatus generates the retrieving condition and sends it to the broadcasting apparatus, and the broadcasting apparatus achieves retrieving and is requested to generate the additional information according to the result of the retrieving, the preference of the viewer concerning a particular person or product can be obtained in real time.

BRIEF DESCRIPTION OF THE DRAWINGS

FIG. 9 is a view of a view log stored by a view-log storage section 13 shown in FIG. 2.

FIG. 10 is a view of a view-information packet generated by a view-information generating section 14 shown in FIG. 2.

FIG. 12 is a view showing view information stored in a view-information data base 65 shown in FIG. 11.

FIG. 13 is a view showing an extracting condition stored in an extracting-condition data base 67 shown in FIG. 11.

DESCRIPTION OF THE PREFERRED EMBODIMENT

Figure 1:
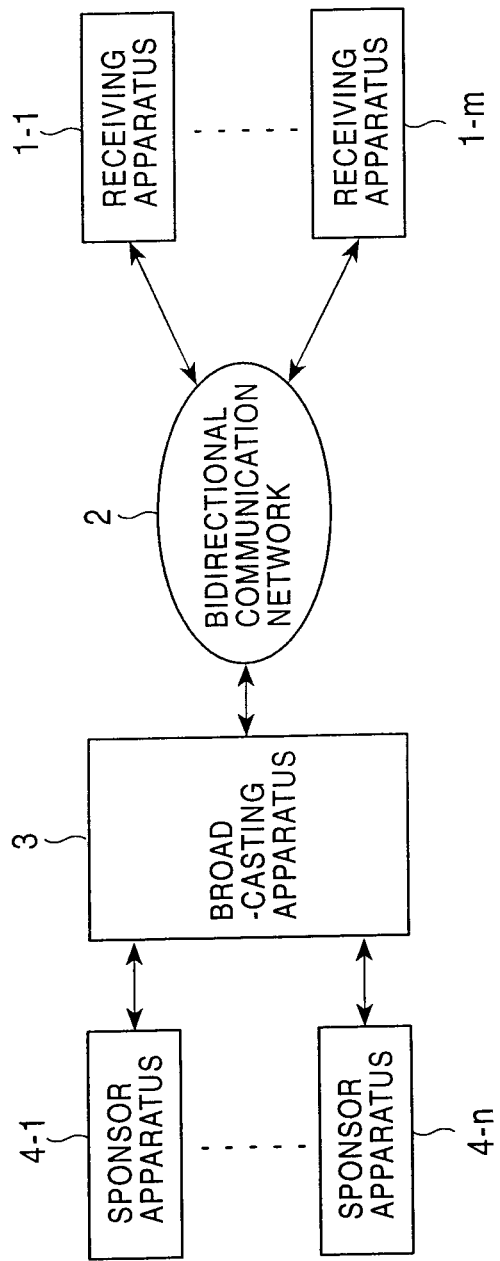
FIG. 1 is a block diagram showing an example structure of a cable television broadcasting system to which the present invention is applied.

The structure of a cable television broadcasting system to which the present invention is applied will be described below by referring to FIG. 1. The term "system" means in this specification an entire gear formed of a plurality of apparatuses and means.

The cable television broadcasting system includes receiving apparatuses 1-1 to 1-*m* (hereinafter collectively called a receiving apparatus 1) installed at viewers' houses connected through a bidirectional communication network 2, a broadcasting apparatus 3 installed at a broadcasting station, and sponsor apparatuses 4-1 to 4-*n* (hereinafter collectively called a sponsor apparatus 4) installed at sponsor companies.

The receiving apparatus 1 receives television broadcasting programs and additional information (details will be described later) transmitted by the broadcasting apparatus 3 through the bidirectional communication network 2. The receiving apparatus 1 obtains the view information (preference information) of the viewer and transmits it to the broadcasting apparatus 3 through the bidirectional communication network 2.

The bidirectional communication network 2 is an information communication network formed of optical cables. The broadcasting apparatus 3 transmits multi-channel programs to the receiving apparatus 1 through the bidirectional communication network 2. The broadcasting apparatus 3 generates the additional information corresponding to the preference of a particular viewer and transmits it to the receiving apparatus 1 corresponding to the viewer through the bidirectional communication network 2.

The sponsor apparatus 4 retrieves the view information of each viewer stored in the broadcasting apparatus 3. The sponsor apparatus 4 instructs the broadcasting apparatus 3 to send additional information.

Figure 2:
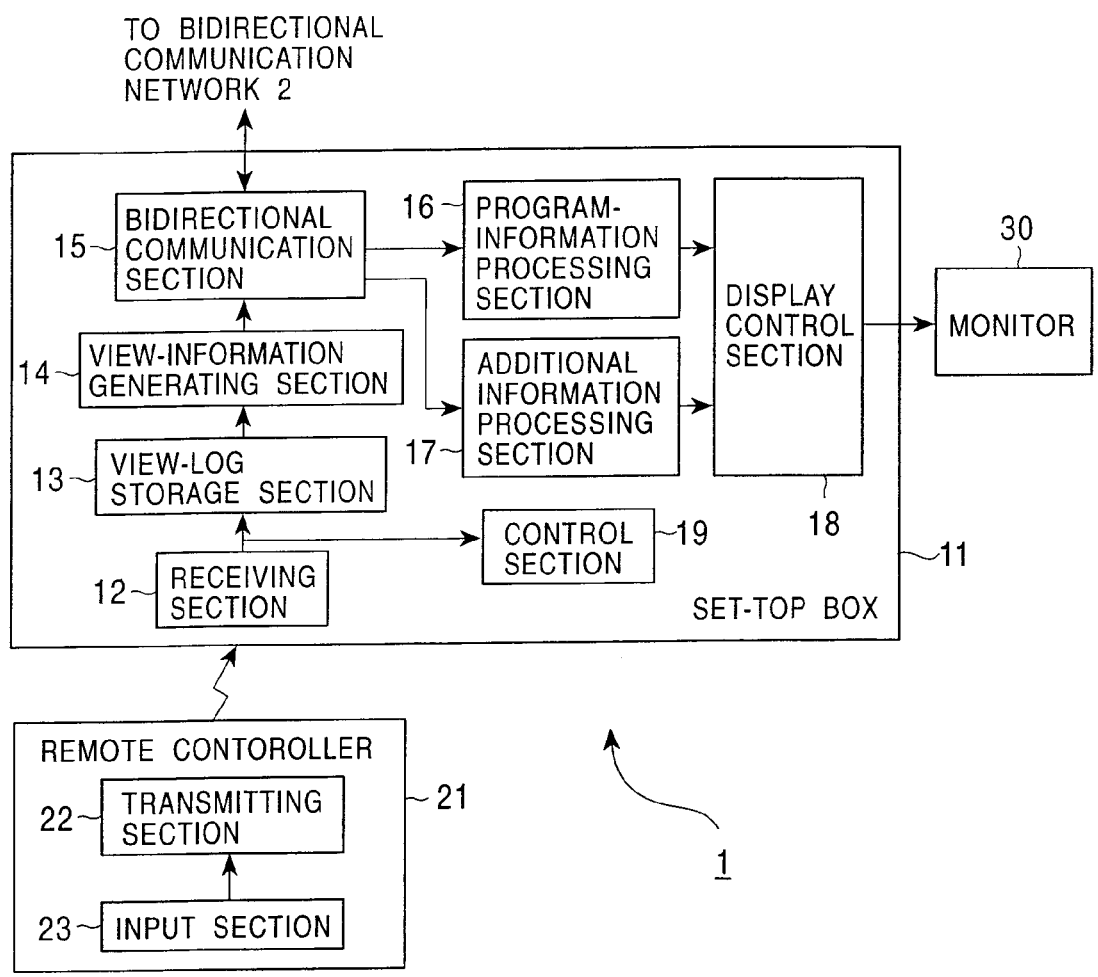
FIG. 2 is a block diagram showing an example structure of a receiving apparatus 1 shown in FIG. 1.

FIG. 2 shows a detailed example structure of the receiving apparatus 1. The receiving apparatus 1 is formed of a set-top box 11 for receiving the information (AV data) of programs transmitted by the broadcasting apparatus 3 and additional information, for applying predetermined processing to them, and for transmitting the view information of the viewer to the broadcasting apparatus 3, and a remote controller 21 with which the viewer inputs the preference and an instruction to the set-top box 11.

The receiving section 12 of the set-top box 11 receives the signal (for example, an infrared signal) of an operation command sent from the remote controller 21 and outputs it to a view-log storage section 13 and to a control section 19.

The view-log storage section 13 stores the operation command input from the receiving section 12 as a view log. A view-information generating section 14 reads the view log stored by the view-log storage section 13 to generate a view-information packet, and outputs it to a bidirectional communication section 15. In a case in which the receiving apparatus 1 is installed at the house of a family of four persons, for example, the view-information generating section 14 has a function for identifying the person who has specified the operation command among the four persons.

The bidirectional communication section 15 transmits the view-information packet input from the view-information generating section 14 to the broadcasting apparatus 3 through the bidirectional communication network 2. The bidirectional communication section 15 outputs the program information received from the broadcasting apparatus 3 through the bidirectional communication network 2, to a program-information processing section 16, and outputs the additional information received from the broadcasting apparatus 3 to an additional-information processing section 17.

The program-information processing section 16 applies predetermined processing (such as decoding processing) to the program information input from the bidirectional communication section 15 and outputs to a display control section 18. The additional-information processing section 17 applies predetermined processing (details will be described later) to the additional information input from the bidirectional communication section 15 and outputs to the display control section 18. The display control section 18 controls a monitor 30 such that the monitor 30 displays the image corresponding to the information input from the program-information processing section 16 or the additional-information processing section 17. The control section 19 controls each section of the set-top box 11 in response to the operation command (such as a channel switching command and a command for adjusting the sound volume) input from the receiving section 12.

The transmitting section 22 of the remote controller 21 converts an operation command input from an input section 23, for example, to an infrared signal and transmits it to the receiving section 12 of the set-top box 11. The input section 23 detects a user's operation on a power button 41 to a notice button 46 (shown in FIG. 3) and outputs the information thereof to the transmitting section 22.

Figure 3:
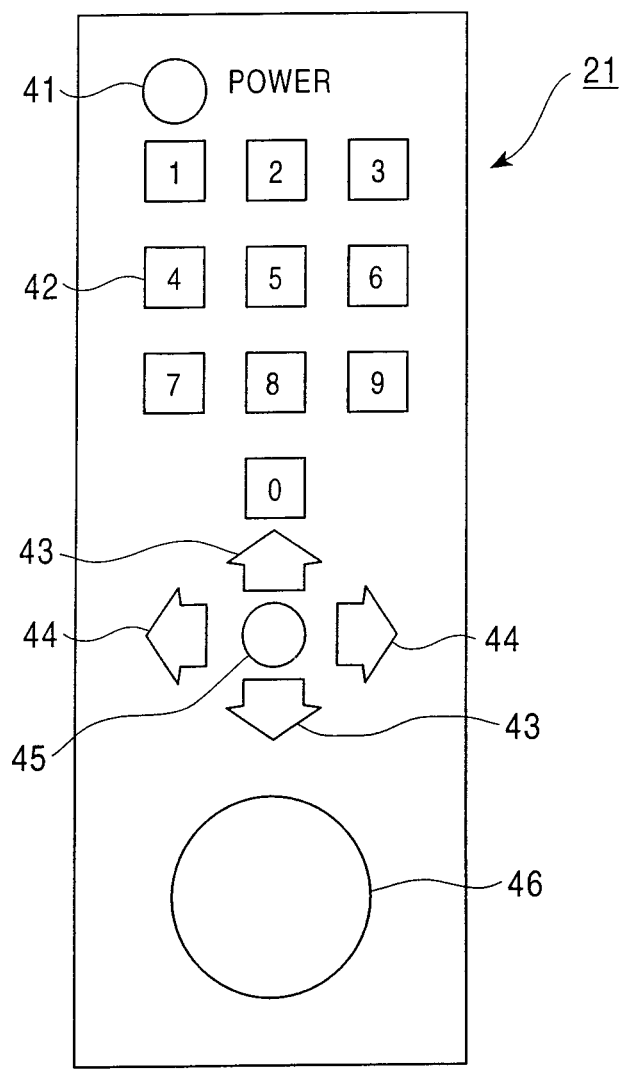
FIG. 3 is a view showing operation buttons provided for a remote controller 21 shown in FIG. 2.

FIG. 3 is an appearance view of the remote controller 21, provided with a plurality of operation buttons. The power button 41 is used for turning on and off the power of the set-top box 11. Ten-key buttons 42 are used for specifying the number of a channel. A sound-volume button 43 is used for adjusting the sound volume. A channel switch button 44 is used for switching the channel.

The sound-volume button 43 and the channel switch button 44 are also operated to specify a choice on the service screen displayed as additional information. A determination button 45 is used for determining the choice selected by using the sound-volume button 43 and the channel switch button 44.

The notice button 46 is operated to inform the broadcasting station of the preference of the viewer (the user of the remote controller 21) concerning a person, a thing, or music in the program being broadcasted (viewed) in cases such as when a favorite actor or actress appears on the screen or when the viewer is interested in the product of the commercial being viewed.

Figure 4:
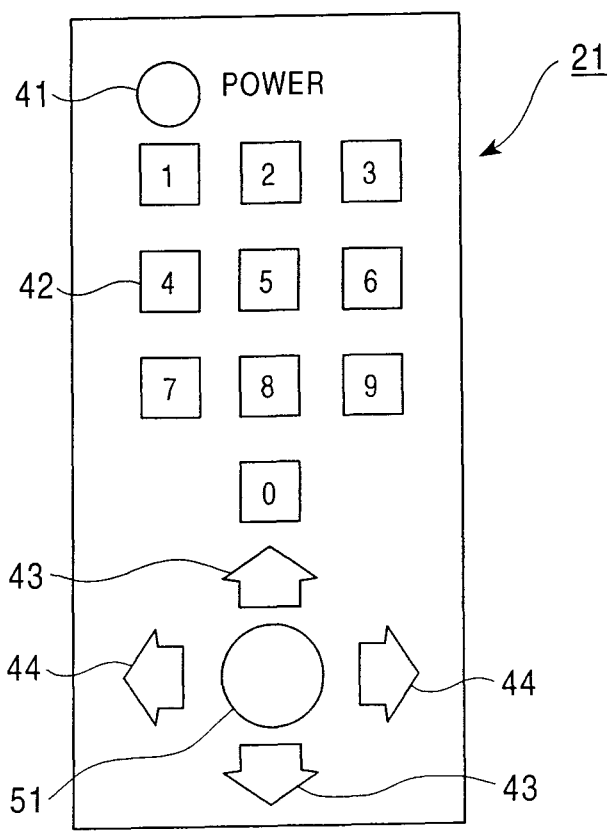
FIG. 4 is a view showing operation buttons provided for the remote controller 21 shown in FIG. 2.

As shown in FIG. 4, the remote controller 21 may be made compact by providing a determination button 51 which integrates the functions of the determination button 45 and the notice button 46.

Figure 5:
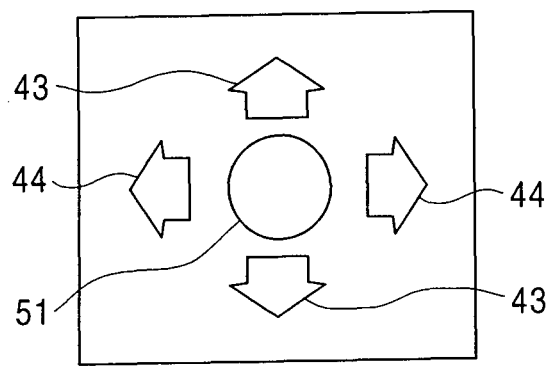
FIG. 5 is a view showing operation buttons provided for the remote controller 21 shown in FIG. 2.

As shown in FIG. 5, among the buttons provided for the remote controller 21, the buttons related to the additional information, the sound-volume button 43 and the channel switch button 44, both used for specifying the choice, and the determination button 51, may be separately provided at another body. In this case, the compactness and the operability of the remote controller 21 are improved.

As described above, the view-information generating section 14 of the set-top box 11 identifies the viewer who has instructed the operation command. To implement this identification, when the receiving apparatus 1 is installed at the house of a family of four persons, for example, four remote controllers 21 each for one person need to be prepared. In this case, it is necessary to store in advance the relationship between the unit ID of each remote controller 21 and the viewer ID of a viewer who uses the remote controller 21 in the view-information generating section 14.

When the four persons share one remote controller 21, the system may be configured such that each person inputs the assigned ID number, which identifies the person, by using the ten-key buttons 42 before using the remote controller 21 or the remote controller 21 has a function for detecting the fingerprint of each user, so that the remote controller 21 identifies the user who has instructed the operation command, and transmits the user ID to the set-top box 11 together with the operation command.

Figure 6:
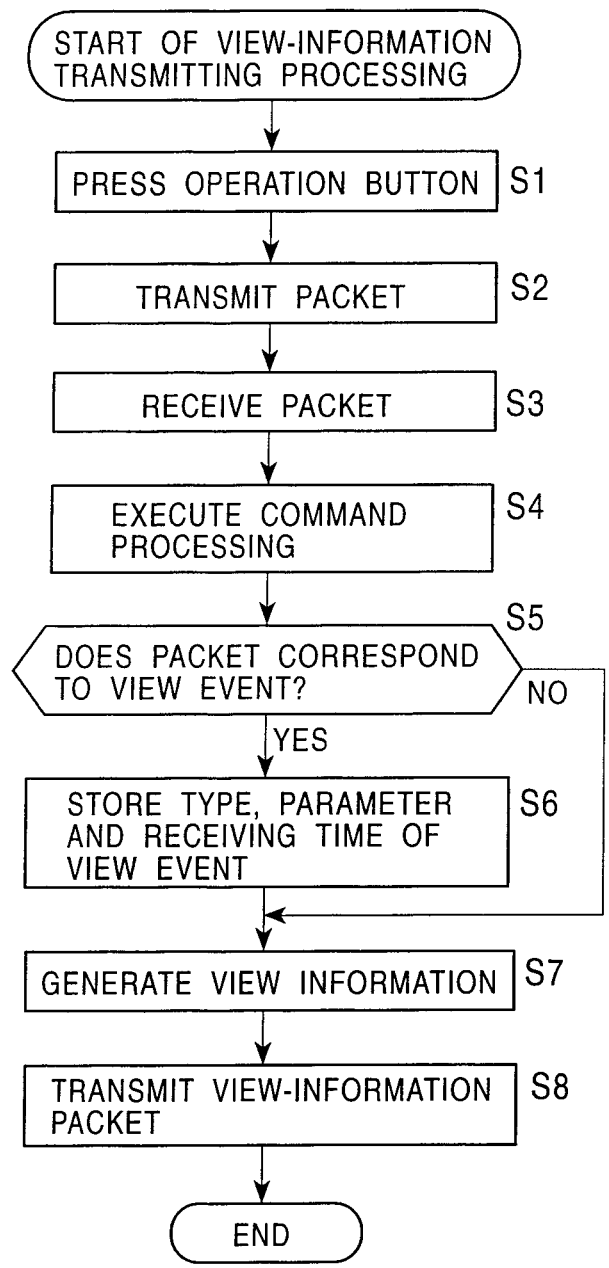
FIG. 6 is a flowchart of view-information transmission processing performed by the receiving apparatus 1.

The operation of the receiving apparatus 1 will be described below by referring to a flowchart shown in FIG. 6. It is assumed in the following description that a plurality of viewers (all family members) have their own remote controllers 21.

When the user (the viewer who operates the remote controller 21) presses an operation button (any of the power button 41 to the notice button 46) on the remote controller 21 in a step S1, the input section 23 detects the operation and outputs the information thereof to the transmitting section 22. The transmitting section 22 generates a packet formed of the remote-controller ID unique to the remote controller 21 and the command ID assigned in advance to the operation command input from the input section 23, as shown in FIG. 7, converts the packet to an infrared signal, and transmits it to the receiving section 12 of the set-top box 11 in a step S2.

In a step S3, the receiving section 12 receives the packet infrared signal from the transmitting section 22 and outputs it to the view-log storage section 13 and to the control section 19. In a step S4, the control section 19 controls each section of the set-top box 11 in response to the command (such as a channel switch command) corresponding to the command ID included in the input packet.

Figures 7, 8:
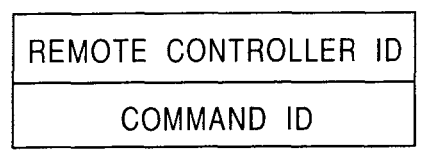
FIG. 7 is a view of a packet generated by a transmitting section 22 shown in FIG. 2.
FIG. 8 is a view of view events.

In a step S5, the view-log storage section 13 determines whether the input packet corresponds to one of five view events (view start, view end, viewer change, channel change, and notice-button pressing) shown in FIG. 8. When it is determined that the input packet corresponds to one of the five view events, the procedure proceeds to a step S6. The view-log storage section 13 stores the type, the parameter, and the receiving time of the view event.

More specifically, while the power of the set-top box 11 is off (the main power is on and the receiving section 12 is ready to operate), when it is determined that the command ID included in the packet input from the receiving section 12 corresponds to the pressing of the power button 41, "view start" is recorded as the type of the view event, and the receiving time thereof is further stored.

While the power of the set-top box 11 is on, when it is determined that the command ID included in the packet input from the receiving section 12 corresponds to the pressing of the power button 41, "view end" is recorded as the type of the view event, and the receiving time thereof is further stored.

When it is determined that the remote-controller ID included in the packet input from the receiving section 12 differs from the remote-controller ID which has been received so far, "viewer change" is recorded as the type of the view event, and the viewer ID corresponding to the remote-controller ID and the receiving time of the packet are further stored. When it is determined that the command ID included in the packet input from the receiving section 12 corresponds to the pressing of a ten-key button or the channel switch button 44, "channel change" is recorded as the type of the view event, and the changed channel number and the receiving time thereof are further stored.

When it is determined that the command ID included in the packet input from the receiving section 12 corresponds to the pressing of the notice button, "notice-button pressing" is recorded as the type of the view event, and the receiving time thereof is further stored.

With the above processing, the view-log storage section 13 records a view log in the order of the receiving times of the view events, as shown in FIG. 8.

In a step S7, the view-information generating section 14 reads the view log stored in the view-log storage section 13 at an interval of a predetermined time (for example, five seconds) to generate a view-information packet, and outputs it to the bidirectional communication section 15. The view-log storage section 13 deletes the view log which has been read by the view-information generating section 14.

FIG. 10 shows the structure of a view-information packet generated by the view-information generating section 14. The unit ID unique to the set-top box 11 is recorded at a set-top box ID field. The number of sets each formed of a view event, a parameter, and the receiving time is stored at the number of recordings field. The information read from the view-log storage section 13 is recorded at a view event field, a parameter field, and a receiving time field. If a view event has no parameter, the type and the receiving time of the view event are recorded.

In a step S8, the bidirectional communication section 15 transmits the view-information packet input from the view-information generating section 14 to the broadcasting apparatus 3 through the bidirectional communication network 2.

When it is determined in the step S5 that the input packet does not correspond to any of the five view events, the step S6 is skipped. Therefore, when the command ID included in the packet sent from the remote controller 21 does not correspond to a view event but to a command for adjusting the sound volume, for example, only the control of the sound volume is performed by the control section 19 in the step S4, and nothing is recorded in the view-log storage section 13.

Figure 11:
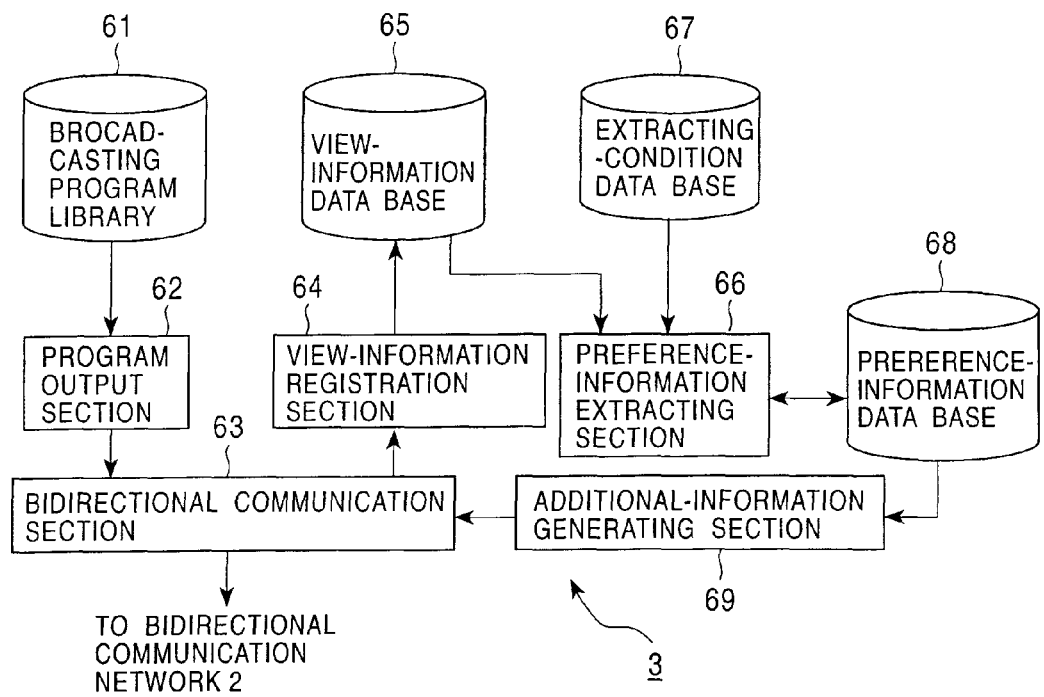
FIG. 11 is a block diagram showing an example structure of a broadcasting apparatus 3 shown in FIG. 1.

Details of the broadcasting apparatus 3 will be described below by referring to FIG. 11. A broadcasting program library 61 stores the AV data (audio data and video data) of the programs and commercials to be broadcasted. A program output section 62 reads the AV data of programs and commercials from the broadcasting program library 61 according to a determined broadcasting schedule, applies predetermined processing (such as encoding processing), and outputs to a bidirectional communication section 63.

A bidirectional communication section 63 transmits the AV data which has been input from the program output section 62 and to which the predetermined processing has been applied, and additional information input from an additional-information generating section 69 to the receiving apparatus 1 through the bidirectional communication network 2. The bidirectional communication section 63 receives a view-information packet transmitted by the receiving apparatus 1 through the bidirectional communication network 2, and outputs it to a view-information registration section 64.

The view-information registration section 64 sorts view events and other data (view events, parameters, and times) included in the view-information packet input from the bidirectional communication section 63 by viewer as shown in FIG. 12, and stores in a view-information data base 65.

A preference-information extracting section 66 retrieves the view events for each viewer stored in the view-information data base 65, by using all retrieving conditions stored in an extracting-condition data base 67, calculates for each viewer the number of times extracting conditions match, and outputs the results to the preference-information data base 68. The preference-information extracting section 66 stores extracting conditions input from the retrieving section 72 (shown in FIG. 15) of the sponsor apparatus 4 in the extracting-condition data base 67, executes retrieving by the use of the extracting conditions, and outputs the results to the retrieving section 72 and to the preference-information data base 68. Details of the operation of the preference-information extracting section 66 will be described later by referring to a flowchart shown in FIG. 16.

The extracting-condition data base 67 stores a plurality of extracting conditions specified by program creators and sponsors. An extracting condition is formed of a channel condition and a condition related to an view event, as shown in FIG. 13.

The case (extracting condition ID=ABC12345) shown in FIG. 13 includes i conditions, "a view event of "notice-button pressing" occurs between time $t_1$ and time $t_1'$ while channel 10 is viewed," "a view event of "notice-button pressing" occurs between time $t_2$ and time $t_2'$ while channel 10 is viewed," . . . and "a view event of "notice-button pressing" occurs between time $t_i$ and time $t_i'$ while channel 10 is viewed."

When a view event of "notice-button pressing" occurs only between time $t_1$ and $t_1'$, the number of times the extracting condition is satisfied is set to one. When a view event of "notice-button pressing" occurs at all time zones, the number of times the extracting condition is satisfied is set to i.

Figures 14, 15:
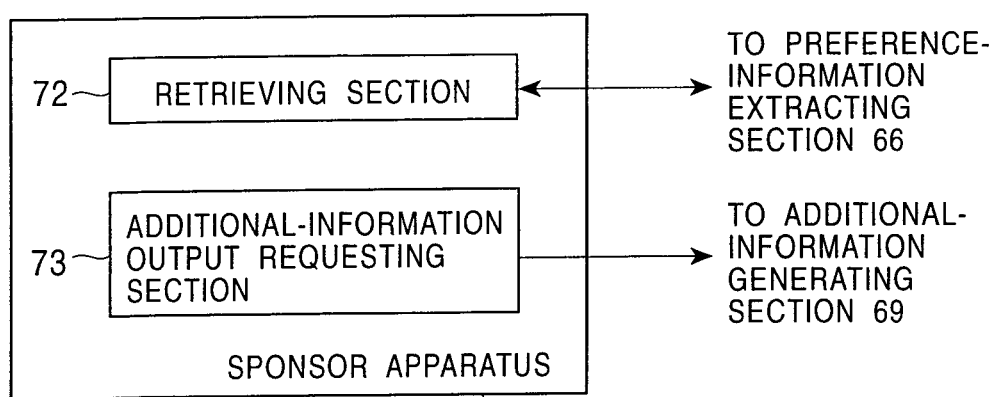
FIG. 14 is a view showing preference information stored in a preference-information data base 68 shown in FIG. 11.
FIG. 15 is a block diagram showing an example structure of a sponsor apparatus 4 shown in FIG. 1.

The preference-information data base 68 stores the extracting result of the preference-information extracting section 66. FIG. 14 shows an example extracting result stored in the view-information data base 65. This case shows that the view information of the viewer (viewer ID=XYZ12345) satisfies twice the view-event conditions constituting the extracting condition (extracting condition ID=ABC12345).

The additional-information generating section 69 generates additional information according to the preference information of each viewer stored in the preference-information data base 68 and outputs it to the bidirectional communication section 63. The additional information generated by the additional-information generating section 69 includes, for example, an electronic program guide created with the preference of the viewer being taken into account, electronic direct mail corresponding to the request of the additional-information output requesting section 73 (shown in FIG. 15) of the sponsor apparatus 4, a program for sending out questionnaires to viewers, and a game program distributed to viewers as a present.

FIG. 15 shows details of the sponsor apparatus 4. The additional-information output requesting section 73 requests the additional-information generating section 69 of the broadcasting apparatus 3 to generate and output predetermined additional information (such as electronic direct mail). The retrieving section 72 generates extracting conditions appropriate to obtain the audience rating and the responses of viewers concerning commercials, and outputs to the preference-information extracting section 66 of the broadcasting apparatus 3. The retrieving section 72 also sends the extracting result input from the preference-information extracting section 66 to the sponsor. The sponsor apparatus 4 is implemented by an application software program executed in a personal computer.

Figure 16:
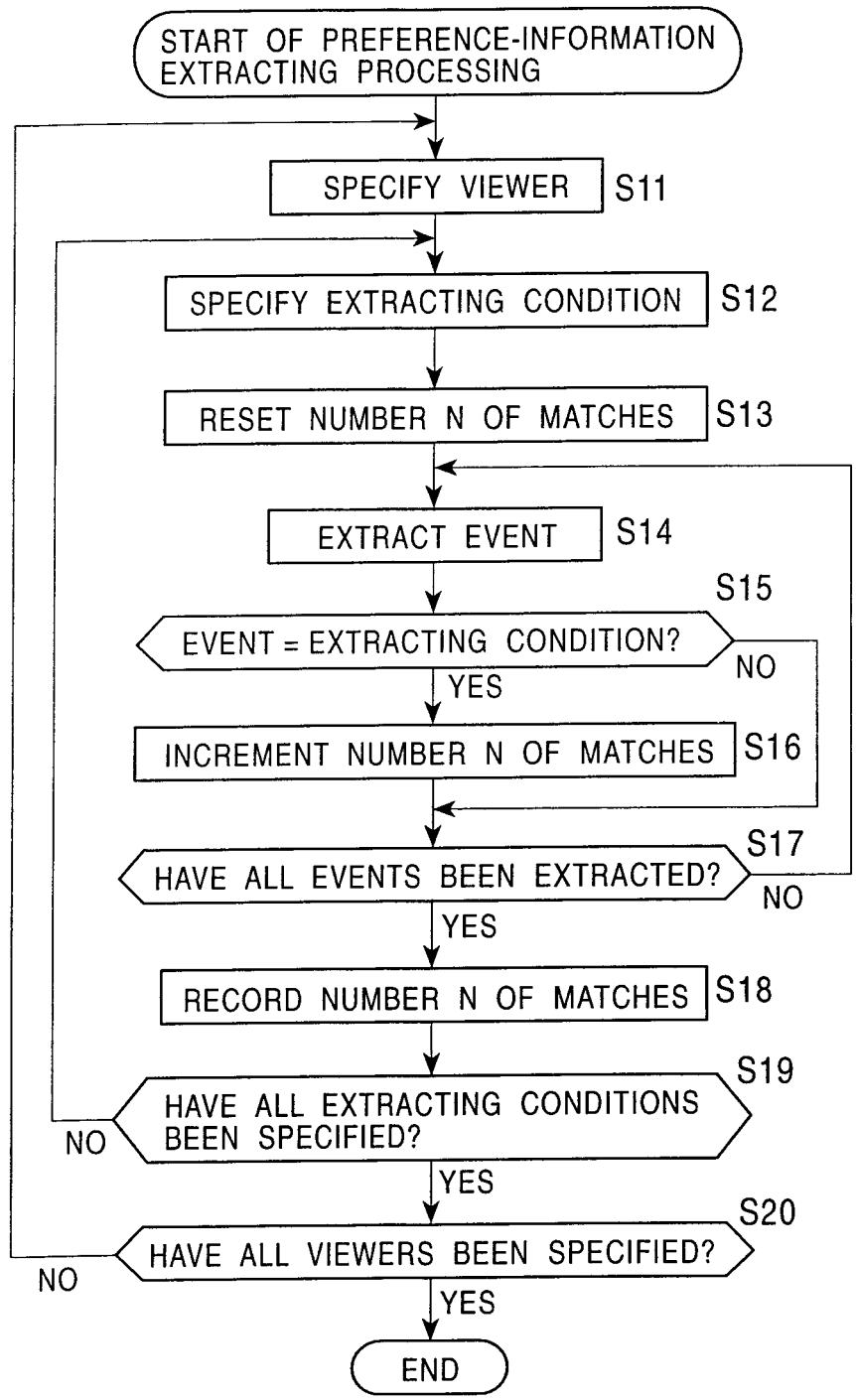
FIG. 16 is a flowchart showing the operation of a preference-information extracting section 66 shown in FIG. 11.

The operation of the preference-information extracting section 66 will be described below by referring to the flowchart shown in FIG. 16. In a step S11, the preference-information extracting section 66 specifies the viewer ID of one person among all viewers whose view information is stored in the view-information data base 65, and reads the corresponding view information from the view-information data base 65.

In a step S12, the preference-information extracting section 66 reads one of all preference conditions stored in the extracting-condition data base 67. In a step S13, the preference-information extracting section 66 resets the number N of matching counts to zero. In a step S14, the preference-information extracting section 66 extracts one of a plurality of view events included in the view information read in the step S11.

In a step S15, the preference-information extracting section 66 determines whether the view event read in the step S14 matches any of the plurality of conditions included in the extracting condition read in the step S12. When it is determined that the view event matches any of the plurality of conditions included in the extracting condition, the procedure proceeds to a step S16. In the step S16, the preference-information extracting section 66 increments the number N of matching counts by one.

In a step S17, the preference-information extracting section 66 determines whether all the view events included in the view information read in the step S11 have been extracted. When it is determined all the view events have not yet been extracted, the procedure returns to the step S14, and the subsequent processing is repeated. When it is determined in the step S17 that all the view events have been extracted, the procedure proceeds to a step S18.

In the step S18, the preference-information extracting section 66 stores the number N of times the view information read in the step S11 satisfies the extracting condition read in the step S12, in the preference-information data base 68.

In a step S19, the preference-information extracting section 66 determines whether all the preference conditions stored in the extracting-condition data base 67 have been read. When it is determined that all the preference conditions stored in the extracting-condition data base 67 have not yet been read, the procedure returns to the step S12, and the subsequent processing is repeated. When it is determined in the step S19 that all the preference conditions stored in the extracting-condition data base 67 have been read, the procedure proceeds to a step S20.

In the step S20, the preference-information extracting section 66 determines whether the viewer information of all viewers stored in the view-information data base 65 has been read. When it is determined that the viewer information of all the viewers stored in the view-information data base 65 has not yet been read, the procedure returns to the step S11, and the subsequent processing is repeated. When it is determined in the step S20 that the viewer information of all the viewers stored in the view-information data base 65 has been read, the preference-information extracting processing is terminated.

When it is determined in the step S15 that the view event does not match any of the plurality of conditions included in the extracting condition, the step S16 is skipped.

As described above, since the preference of a particular viewer can be obtained by the use of the preference information of each viewer stored in the preference-information data base 68, an electronic program guide generated with the preference of a viewer being taken into account, for example, can be distributed. In addition, for example, the sponsor can send electronic direct mail to viewers who show interest in a commercial of the sponsor because viewers who are interested in a particular person or thing on the screen can be searched for.

In the present embodiment, the interval at which the view-information generating section 14 generates a view-information packet, namely, the interval at which the receiving apparatus 1 transmits view information to the broadcasting apparatus 3 through the bidirectional communication network 2, is set to five seconds, with the time required for the viewer to finish a series of operations (such as turning on the power and selecting the channel) being taken into account. The interval is not limited to this value. When the interval is made shorter, more-real-time view information is provided but the processing speed of the entire system decreases because the broadcasting apparatus 3 have to execute preference-information extracting processing more frequently. Conversely, when the interval is made longer, the processing speed of the system is increased because the broadcasting apparatus 3 needs to execute the preference-information extracting processing less frequently, but real-time view information deteriorates.

The present invention can also be applied to a television broadcasting system employing radio waves. In this case, a public telephone line needs to be used for transmitting a view-information packet from the receiving apparatus 1 to the broadcasting apparatus 3.

A computer program for executing each of the above processing can be distributed to the user by providing media formed of information recording media, such as magnetic disks and CD-ROMs, and by network providing media, such as the Internet and digital satellites.

What is claimed is:

1. An apparatus for generating user preference information, comprising:
   a bidirectional communication section for receiving event information corresponding to a first user's operation of a first control device and a second user's operation of a second control device, the event information indicating (i) that the first user operated the first control device while an interval within which content preferred by the first user was presented to the first user and (ii) that the second user operated the second control device while an interval within which content preferred by the second user was presented to the second user;
   an extracting condition storage device for storing extracting conditions for extracting user preference information from the event information, wherein the extracting conditions are generated by one or more sponsor apparatuses, connected to the bidirectional communication network, and include a channel condition, a plurality of view event conditions, and a plurality of time interval conditions comprised of a start time and an end time; and
   a preference information extracting section for generating the user preference information by specifying a single user among all users with extracting conditions stored in the extracting conditions storage device and extracting a portion of the event information corresponding to that single user that matches the conditions specified by the extracting conditions, until all of the event information corresponding to that single user is extracted, and then again specifying a user among all users with extracting conditions stored in the extracting conditions storage device and extracting a portion of the event information corresponding to that specified user that matches the conditions specified by the extracting conditions, until all of the event information corresponding to that specified user is extracted, until the event information of all users has been extracted.

2. The apparatus according to claim 1, further comprising an additional-information generating section for generating additional information including an electronic programming guide for the first user based on the extracted user preference information.

3. A method for generating user preference information, the method comprising:
   receiving event information corresponding to a first user's operation of a first control device and a second user's operation of a second control device, the event information indicating (i) that the first user operated the first control device while a portion of content preferred by the first user was presented to the first user and (ii) that the second user operated the second control device while a portion of content preferred by the second user was presented to the second user;
   storing extracting conditions for extracting user preference information from the event information, wherein the extracting conditions are generated by one or more sponsor apparatuses, connected to the bidirectional communication network, and include a channel condition, a plurality of view event conditions, and a plurality of time interval conditions comprised of a start time and an end time; and
   generating the user preference information by specifying a single user among all users with extracting conditions stored in the extracting conditions storage device and extracting a portion of the event information corresponding to that single user that matches the conditions specified by the extracting conditions, until all of the event information corresponding to that single user is extracted, and then again specifying a user among all users with extracting conditions stored in the extracting conditions storage device and extracting a portion of the event information corresponding to that specified user that matches the conditions specified by the extracting conditions, until all of the event information corresponding to that specified user is extracted, until the event information of all users has been extracted.

4. The method according to claim 3, further comprising generating additional information including an electronic programming guide for the first user based on the extracted user preference information.

5. A non-transitory, computer-readable medium containing processor-readable instructions for causing a processor to execute a method for generating user preference information, the method comprising:
   receiving event information corresponding to a first user's operation of a first control device and a second user's operation of a second control device, the event information indicating (i) that the first user operated the first control device while a portion of content preferred by the first user was presented to the first user and (ii) that the second user operated the second control device while a portion of content preferred by the second user was presented to the second user;

storing extracting conditions for extracting user preference information from the event information, wherein the extracting conditions are generated by one or more sponsor apparatuses, connected to the bidirectional communication network, and include a channel condition, a plurality of view event conditions, and a plurality of time interval conditions comprised of a start time and an end time; and generating the user preference information by specifying a single user among all users with extracting conditions stored in the extracting conditions storage device and extracting a portion of the event information corresponding to that single user that matches the conditions specified by the extracting conditions, until all of the event information corresponding to that single user is extracted, and then again specifying a user among all users with extracting conditions stored in the extracting conditions storage device and extracting a portion of the event information corresponding to that specified user that matches the conditions specified by the extracting conditions, until all of the event information corresponding to that specified user is extracted, until the event information of all users has been extracted.

* * * * *